Oct. 10, 1933.  V. G. APPLE  1,930,033

MEANS FOR AUTOMATICALLY SUPPLYING FLUID BRAKE SYSTEMS

Filed June 12, 1930

INVENTOR.
Vincent G. Apple
BY
Burton & McConkey
ATTORNEYS

Patented Oct. 10, 1933

1,930,033

UNITED STATES PATENT OFFICE 1,930,033

MEANS FOR AUTOMATICALLY SUPPLYING FLUID BRAKE SYSTEMS

Vincent G. Apple, Dayton, Ohio, assignor to Bendix Brake Company, South Bend, Ind., a corporation of Illinois Application June 12, 1930. Serial No. 460,726

7 Claims. (Cl. 188—152)

My invention relates to hydraulic brake systems for automotive vehicles and has particular reference to means for maintaining a constant supply of fluid to be used therein.

An object of my invention is to utilize the oil supply source of an automatic pressure lubricating system as a source of supply for the fluid of a hydraulic brake system. My particular improvement resides in providing means whereby the fluid contained in the main supply reservoir of such a system may automatically be drawn off intermittently and forced into an auxiliary reservoir from which the master fluid cylinder of the brake system is replenished as it is needed.

In automatic pressure lubricating systems it is common practice to provide a supply reservoir for the lubricating fluid as well as some means for forcing fluid therefrom to the various parts of the vehicle to be lubricated. Such a lubrication system, and means for providing the pressure therein, is adaptable for use in conjunction with my improvement, but while I have illustrated the improvement in conjunction with such a system I do not contemplate any such limitation. To so alter the system as to render it operative with manually operated forced feed lubricating systems would involve but a matter of mechanical skill.

Various meritorious features of my invention will become apparent from the following description taken in conjunction with the drawing wherein.

Figure 1:
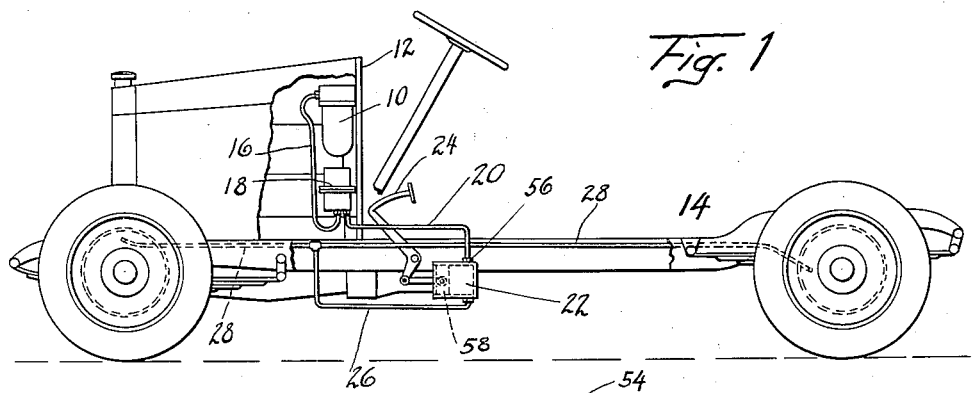
Fig. 1 illustrates a somewhat diagrammatical view of my improved combination of elements.
Figure 2:
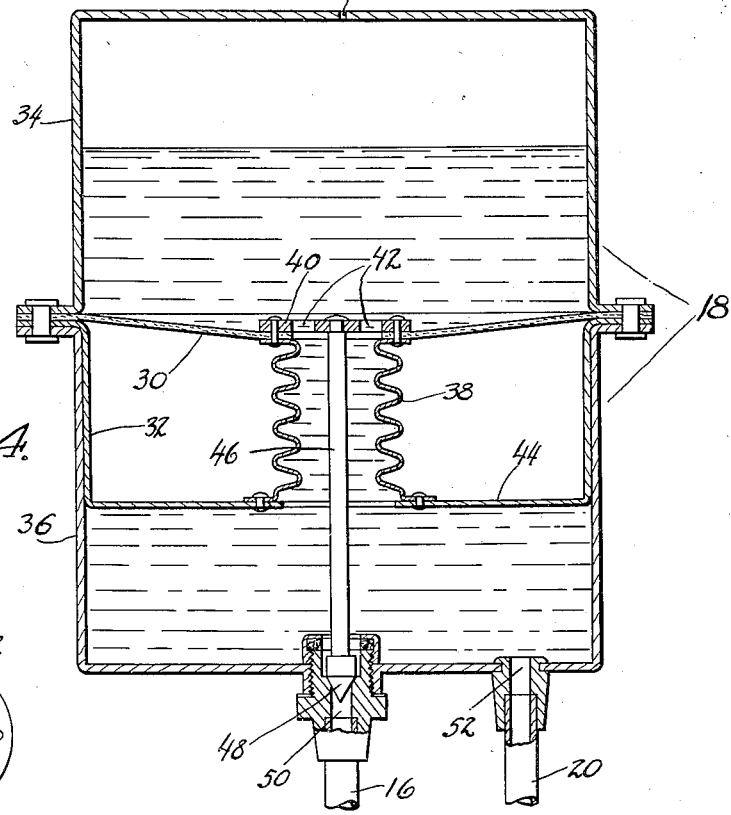
Fig. 2 is an enlarged section of my improved auxiliary supply reservoir.
Figure 4:
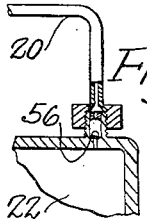
Fig. 4 is a sectional view of the check valve.
Figure 3:
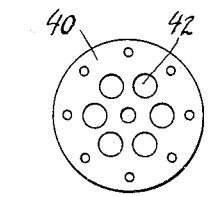
Fig. 3 is an enlarged plan of the by-pass plate constituting a part thereof.

The main supply reservoir 10 of the lubricating system is mounted on the dashboard 12 of the vehicle, broadly indicated by the numeral 14. A conduit 16 connects the reservoir 10 with my improved auxiliary reservoir 18 which is in turn connected by conduit 20 to the master fluid cylinder 22 of the hydraulic brake system.

Pressure is maintained in the reservoir 10 by any suitable means, not illustrated.

The hydraulic brakes are actuated in the usual fashion. Depression of the brake pedal 24 forces the liquid into the conduit 26 and from there through the branch conduits 28 to the brakes.

My auxiliary reservoir 18 includes a diaphragm 30 which is secured to the flange of a cup 32 by clamping the two about their peripheries between the two flanged sections 34 and 36 of the reservoir 18. One extremity of a flexible tube 38 is secured about the periphery of a central aperture in the diaphragm 30, which aperture is covered by the by-pass plate 40 which is fastened both to the diaphragm and to the extremity of the flexible tube 38. The plate 40 is provided with a number of openings 42 to permit the passage of liquid therethrough. The other extremity of tube 38 is secured about the periphery of a central aperture in the bottom 44 of cup member 32.

The upper extremity of valve stem 46 is secured to the center of plate 40 and its lower extremity carries a tapered valve member 48. This valve member is adapted, when seated, to close the passage 50 which passage is connected directly with conduit 16 leading from the main supply reservoir 10. A second opening 52 at the bottom of auxiliary reservoir 18 is connected through conduit 20 with the master fluid cylinder 22 of the hydraulic brake system.

The top of the auxiliary reservoir 18 is provided with a small air vent 54 to permit atmospheric pressure within the upper portion of the reservoir, above diaphragm 30. The pressure within the cup 32 is reduced to a point slightly below atmospheric pressure, the differential being determined by the amount of fluid to be normally maintained in the auxiliary reservoir 18, the normal pressure in conduit 16, and the pressure area of diaphragm 30. These are the variable factors which may be designed to operate satisfactorily in any desired combination by shifting the differential in pressure above and below diaphragm 30.

The fluid from auxiliary reservoir 18 flows by gravity down through conduit 20 into the master cylinder 22. A check valve 56 is provided at the opening of this conduit into the cylinder 22 in order that the pressure created by movement of the cylinder piston 58 when the brakes are operated will not create back pressure in the auxiliary reservoir 18.

There is invariably a certain amount of leakage through the conduits 28 and from the master cylinder 22 itself. This leakage will be compensated for by the flow of fluid down from the reservoir 18 and when the level of the fluid in the said reservoir 18 has reached a predetermined minimum the pressure in the upper portion 34 becomes insufficient to maintain the valve 48 seated. Upon opening of this valve the pressure in conduit 16 will force the fluid from supply reservoir 10 into the auxiliary reservoir 18 until the level therein has again reached a point where sufficient pressure is exerted upon diaphragm 30 to close valve 48. In this way any loss of fluid from the master cylinder 22 is replenished by the supply in auxiliary reservoir 18, and the supply in said auxiliary reservoir is automatically maintained sufficient to make up for any normal loss in the hydraulic brake system.

Various modifications will be apparent to those skilled in the art, and for that reason I intend to limit myself only within the scope of the appended claims.

I claim:

1. In combination with a fluid pressure lubricating reservoir and a hydraulic brake system including a master cylinder, an auxiliary reservoir, a conduit connecting said auxiliary reservoir with the master cylinder, a conduit connecting the two reservoirs, and a valve in the opening of said last conduit responsive to a predetermined difference in pressure between the pressure therein and the pressure in the auxiliary reservoir.

2. In combination with a fluid pressure lubricating reservoir and a hydraulic brake system including a master cylinder, an auxiliary reservoir, a conduit connecting said auxiliary reservoir with the master cylinder, a conduit connecting the two reservoirs, and a valve in the opening of said last conduit responsive to a predetermined difference in pressure between the pressure therein and the pressure in the auxiliary reservoir caused by a drop in liquid level therein.

3. In combination with a fluid pressure lubricating system having a supply reservoir, a hydraulic brake system, an auxiliary fluid chamber directly connected with the brake system and with the supply reservoir through a pressure controlled valve, and means within the auxiliary fluid chamber for constantly maintaining a closing pressure upon said valve slightly less than the pressure in the supply reservoir, said difference lying within the range of additional pressure created therein by the auxiliary oil supply, whereby a predetermined reduction of the oil level will reduce the closing pressure on the valve sufficiently to permit its opening in response to the pressure from the supply reservoir.

4. In a fluid container, an intake opening, an outlet opening, a valve stem having a valve secured at one extremity thereof and normally adapted to seat in said intake opening, a flexible diaphragm constituting a dividing partition in said container and having an aperture therein, and a perforated plate secured to the opposite extremity of said valve stem and fastened to said diaphragm to cover the aperture therein.

5. In a fluid container, an intake opening, an outlet opening, a valve stem having a valve secured at one extremity thereof and normally adapted to seat in said intake opening, a flexible diaphragm constituting a dividing partition in said container and having an aperture therein, a perforated plate secured to the opposite extremity of said valve stem and fastened to said diaphragm to cover the aperture therein, and a sealed chamber below said diaphragm having an opening extending therethrough in alignment with said valve stem.

6. In combination with a pressure lubricating system having a supply of lubricant under pressure, a hydraulic brake system, an auxiliary chamber connected with said supply and with said brake system, an air compartment within said auxiliary chamber and means responsive to the difference between the oil and air pressure within said auxiliary chamber for opening and closing its connection with said supply.

7. In combination with a pressure lubricating system having a supply of lubricant under pressure, a hydraulic brake system, an auxiliary chamber connected with said supply and with said brake system, an air compartment within said auxiliary chamber and means within the chamber responsive to the difference between the oil and air pressure therein for opening and closing its connection with said supply.

VINCENT G. APPLE.